(12) United States Patent
Reis et al.

(10) Patent No.: US 10,815,000 B2
(45) Date of Patent: Oct. 27, 2020

(54) SHORT REJECTED TAKEOFF SYSTEM AND METHOD

(71) Applicant: Embraer S.A., São José dos Campos-SP (BR)

(72) Inventors: Jose Roberto Ferreira Clark Reis, São José dos Campos (BR); Patrice London Guedes, São José dos Campos (BR); Jonatan Teruo Yamazaki, São José dos Campos (BR); Nelson Barbosa, São José dos Campos (BR)

(73) Assignee: Embraer S.A., Sao Jose dos Campos-SP (BR)

( * ) Notice: Subject to any disclaimer, the term of this patent is extended or adjusted under 35 U.S.C. 154(b) by 0 days.

(21) Appl. No.: 15/169,191

(22) Filed: May 31, 2016

(65) Prior Publication Data

US 2017/0341772 A1  Nov. 30, 2017

(51) Int. Cl.
*B64D 45/00* (2006.01)
*B64D 43/00* (2006.01)
(Continued)

(52) U.S. Cl.
CPC .......... *B64D 45/00* (2013.01); *B64C 3/58* (2013.01); *B64C 13/16* (2013.01); *B64C 25/426* (2013.01);
(Continued)

(58) Field of Classification Search
CPC ........ B64D 45/00; B64D 43/00; B64D 43/02; B64D 33/04; B64D 31/06;
(Continued)

(56) References Cited

U.S. PATENT DOCUMENTS 3,066,896 A    12/1962 Schirtzinger
4,490,802 A    12/1984 Miller
(Continued)

FOREIGN PATENT DOCUMENTS

FR    2 650 101 A1    1/1991

OTHER PUBLICATIONS

Advisory Circular, "Takeoff Safety Training Aid," U.S. Department of Transportation, Federal Aviation Administration, AC No. 120-62, Sep. 12, 1994, 10 pages.
(Continued)

*Primary Examiner* — Donald J Wallace
(74) *Attorney, Agent, or Firm* — Nixon & Vanderhye, P.C.

(57) ABSTRACT

The disclosed non-limiting embodiment provides important improvements in aircraft performance in short rejected takeoff systems by automatically detecting whether the speed of the aircraft does not exceed Vshort, where Vshort>V1; automatically detecting whether one of said plural engines has failed during takeoff while the aircraft is still in contact with the ground; and if the aircraft speed does not exceed vshort and an engine has failed, automatically performing an autonomous abort takeoff sequence to allow an improved takeoff weight in case of a single engine failure autonomously rejected takeoff. The aircraft's take off weight increase leads to increased payload or fuel quantity. The Payload increase allows for increased passenger and/or cargo capability. The fuel quantity increased allows the aircraft to achieve greater ranges. An aircraft provided with the proposed system, which reduces accelerate-stop distance, may then operate in shorter runways as compared to the prior art.

12 Claims, 5 Drawing Sheets

Example Improvement

(51) Int. Cl.
*B64C 3/58* (2006.01)
*B64C 13/16* (2006.01)
*B64C 25/42* (2006.01)
*B64D 31/06* (2006.01)
*B64D 33/04* (2006.01)
*B64D 43/02* (2006.01)

(52) U.S. Cl.
CPC ............ *B64D 31/06* (2013.01); *B64D 33/04* (2013.01); *B64D 43/00* (2013.01); *B64D 43/02* (2013.01); *B64D 2045/0085* (2013.01); *Y02T 50/44* (2013.01)

(58) Field of Classification Search
CPC ............ B64D 2045/0085; B64C 13/16; B64C 13/503; B64C 3/58; B64C 25/426
See application file for complete search history.

(56) References Cited

U.S. PATENT DOCUMENTS

| | | | |
|---|---|---|---|
| 4,837,695 A * | 6/1989 | Baldwin | G05D 1/0083 701/15 |
| 4,843,554 A | 6/1989 | Middleton et al. | |
| 5,142,478 A | 8/1992 | Crook | |
| 5,499,025 A | 3/1996 | Middleton et al. | |
| 5,668,541 A * | 9/1997 | Coquin | G05D 1/0083 340/959 |
| 6,527,225 B1 | 3/2003 | Silder, Jr. et al. | |
| 6,614,397 B2 | 9/2003 | Pullen et al. | |
| 7,720,579 B2 | 5/2010 | Goodman et al. | |
| 7,751,951 B2 | 7/2010 | Pitard et al. | |
| 7,885,734 B2 | 2/2011 | Lemoult et al. | |
| 8,560,149 B1 | 10/2013 | Ganguli et al. | |
| 9,164,505 B1 | 10/2015 | Peck et al. | |
| 9,738,378 B1 * | 8/2017 | Nikolic | B64D 43/00 |
| 10,202,204 B1 * | 2/2019 | Daidzic | B64D 45/08 |
| 2004/0054448 A1 | 3/2004 | Ito | |
| 2007/0124034 A1 | 5/2007 | Pitard et al. | |
| 2008/0154445 A1 * | 6/2008 | Goodman | B60T 8/1703 701/3 |
| 2008/0215198 A1 | 9/2008 | Richards | |
| 2008/0258014 A1 | 10/2008 | McCoskey et al. | |
| 2010/0094488 A1 | 4/2010 | Michal et al. | |
| 2010/0241294 A1 | 9/2010 | Virelizier et al. | |
| 2011/0040431 A1 | 2/2011 | Griffith et al. | |
| 2011/0118909 A1 | 5/2011 | Ishihara et al. | |
| 2011/0184623 A1 | 7/2011 | De Boer | |
| 2013/0085629 A1 | 4/2013 | Washington et al. | |
| 2013/0211636 A1 * | 8/2013 | Martins | G05D 1/0083 701/15 |
| 2014/0225753 A1 | 8/2014 | Conrardy et al. | |
| 2014/0239126 A1 | 8/2014 | Hara | |
| 2014/0257603 A1 | 9/2014 | McKeown et al. | |
| 2015/0005982 A1 | 1/2015 | Muthukumar | |
| 2015/0102166 A1 | 4/2015 | Moser et al. | |
| 2015/0120098 A1 | 4/2015 | Catalfamo et al. | |
| 2015/0254988 A1 | 9/2015 | Wang et al. | |
| 2019/0056740 A1 | 2/2019 | Westphal et al. | |

OTHER PUBLICATIONS

George, Fred, "Pilot Report: Gulfstream G500," Aviation Week, BCA Business & Commercial Aviation, Oct. 19, 2016, 13 pages.
Notice of Allowance and Fee(s) Due dated May 20, 2019, issued in U.S. Appl. No. 15/698,337.

* cited by examiner

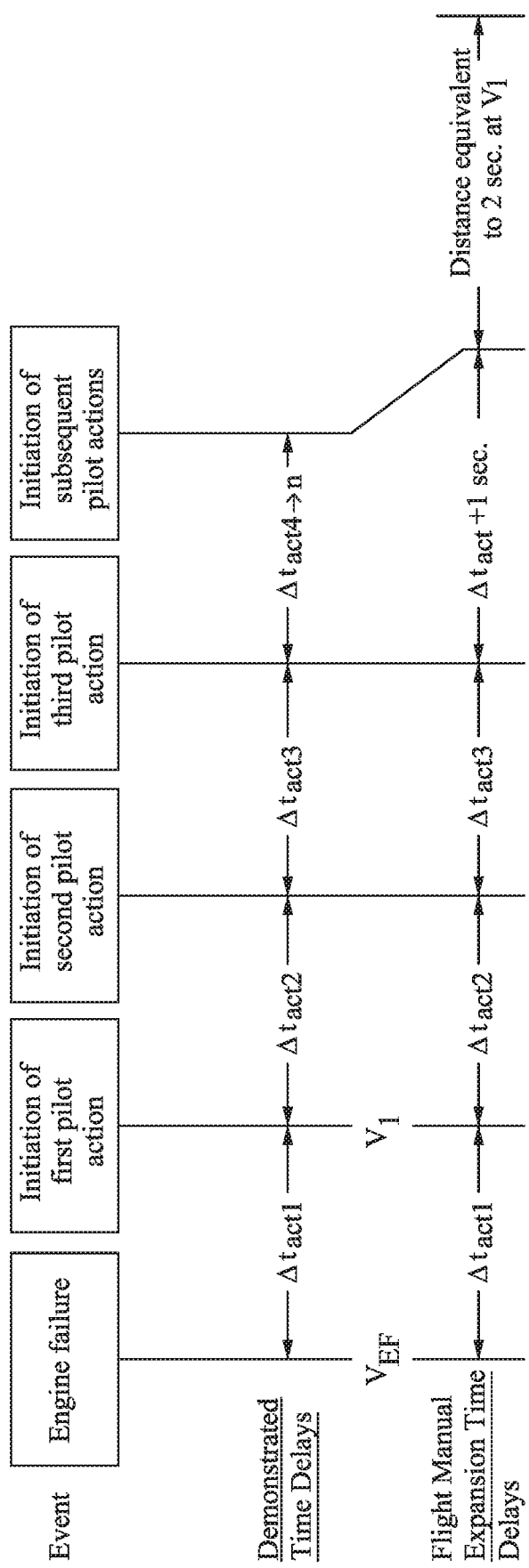
Figure 1 - Example Time Delays

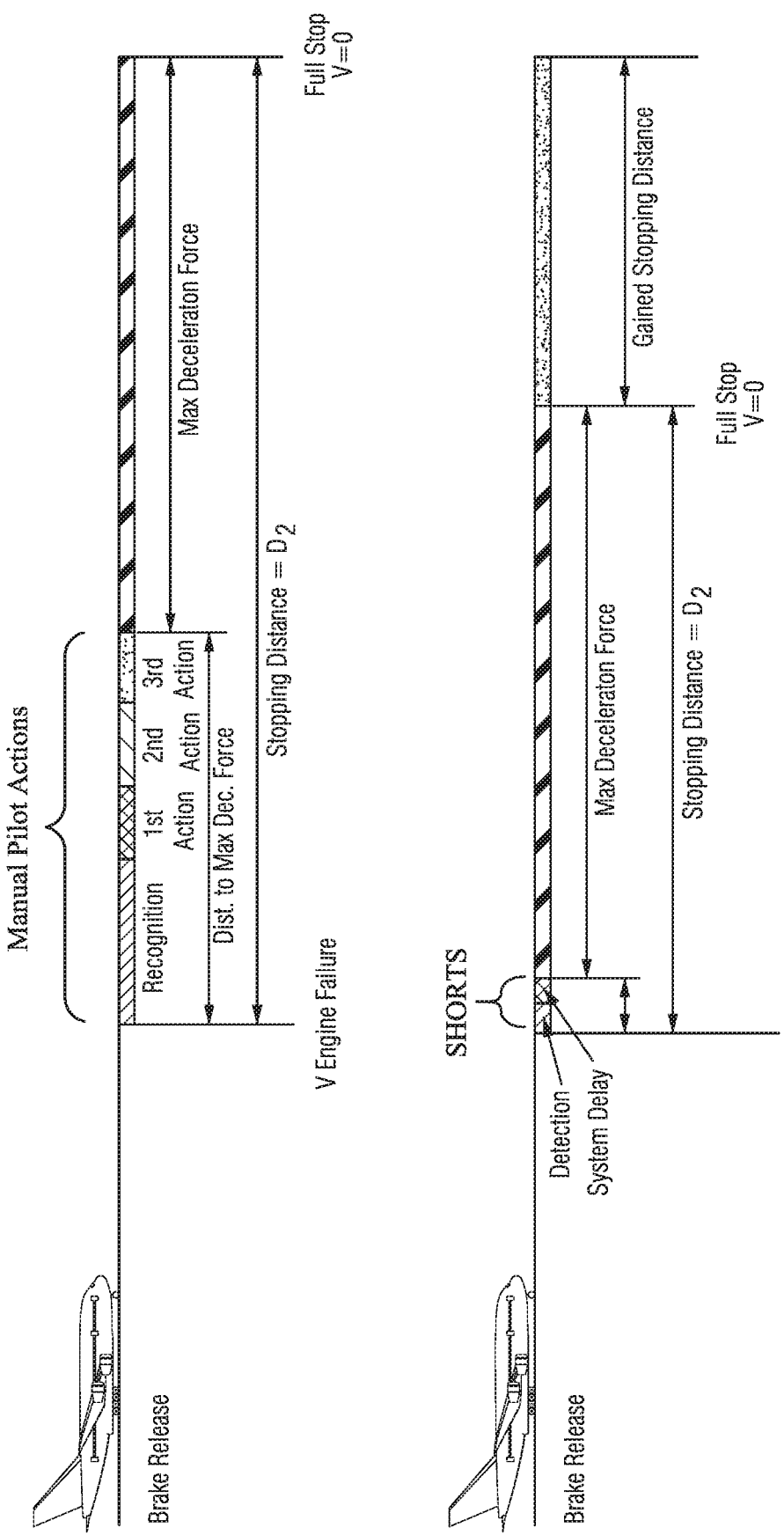

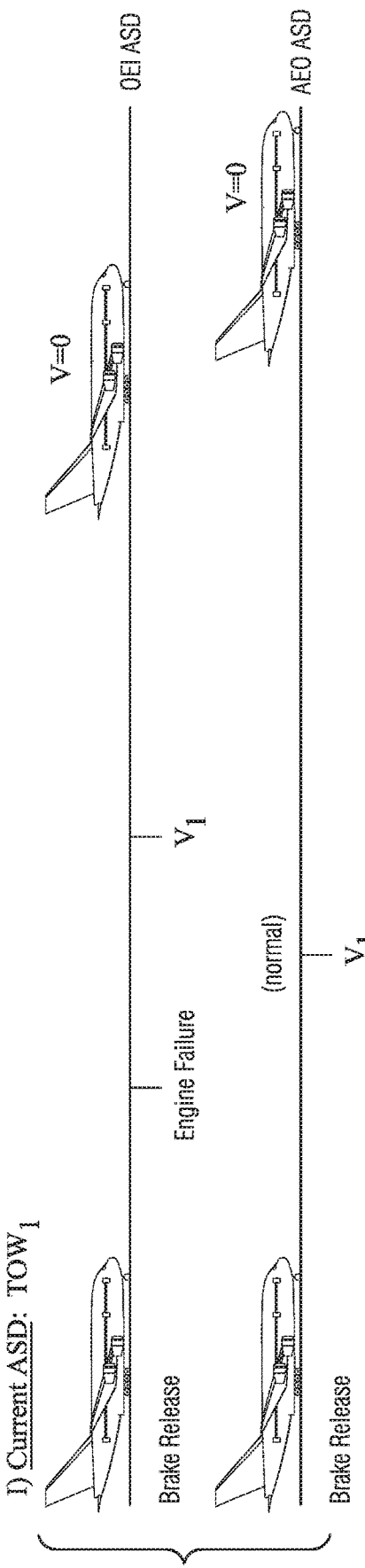
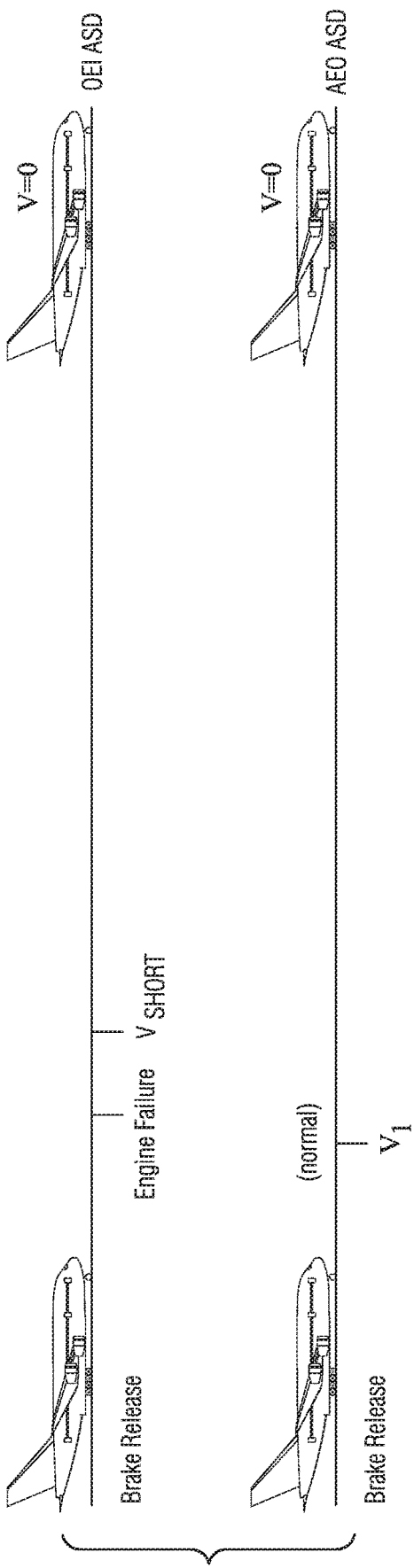
Figure 3A (Prior Art)
Figure 3B - Example Improvement

SHORT REJECTED TAKEOFF SYSTEM AND METHOD

STATEMENT REGARDING FEDERALLY SPONSORED RESEARCH OR DEVELOPMENT

None.

CROSS-REFERENCE TO RELATED APPLICATIONS

None.

FIELD

The technology herein relates to avionics, and more particularly to performance/automatic flight control systems and methods.

BACKGROUND & SUMMARY

Rejected takeoff (RTO) in case of single engine failure (OEI) is typically manually initiated by the pilot after they recognize the engine has failed. This usually occurs when failure of an engine produces an asymmetric thrust, leading to an aircraft yaw.

Pilots, humans as they are, have some delay in recognizing and taking necessary actions to abort takeoff when an engine fails. Certification requirements impose fixed margins in order to compensate for pilot delays. The Certification requirements, 14CFR25-FAR 25.109, through the corresponding AC 25-7C, "Flight Test Guide for Certification of Transport Category Airplanes", establish the following minimum times criteria (see FIG. 1):

Recognition and first action: 1 second
Following actions: 1 second for each subsequent action.

In more detail, FIG. 1 shows an engine failure event ($V_{EF}$) following by a time delay $\Delta t_{act1}$ before initiation of a first pilot action at $V_1$. A further time delay $\Delta t_{act2}$ occurs before initiation of a second pilot action. A further time delay $\Delta t_{act3}$ occurs before initiation of a third pilot action. Based on FAA regulations, a still further time delay $\Delta t_{act4}$ must be allowed as $\Delta t_{act}+1$ second before initiation of subsequent pilot actions.

Furthermore, as FIG. 1 also shows, FAA regulations require an additional distance equivalent to 2 seconds at speed $V_1$ to stop the aircraft. Specifically, the requirements specify that a distance margin corresponding to 2 seconds at constant $V_1$ should be considered in the ASD (Accelerate-Stop Distance). FAA Certification requirements under 14 CFR 25, 25.109, meanwhile, establish that the accelerate-stop distance (ASD) of an aircraft is the greater of the AEO (All Engines Operating) condition and the OEI (One Engine Inoperative) condition.

What may not be evident from FIG. 1 is that reducing pilot delays will improve aircraft performance. The greater the pilot delays, the greater the necessary distance to abort the takeoff and stop the aircraft. Considering short runways, this greater ASD necessitates a decrease in the TOW (take-off weight). This TOW decrease in turn results in a technical limitation for the aircraft, since the aircraft may be unable to carry the otherwise-possible maximum payload and/or fuel. Therefore, reducing TOW leads to economic impacts to operators and passengers. For example, considering the technical limitation related to payload, the number of passengers or cargo may be reduced. This increases operational costs. In addition, fuel quantity limits the maximum range to be achieved by the aircraft, possibly requiring intermediate landings.

BRIEF DESCRIPTION OF THE DRAWINGS

The following detailed description of exemplary non-limiting illustrative embodiments is to be read in conjunction with the drawings of which:

FIG. 1 shows time delays according to AC 25-7C (related to FAR 25.109);
FIG. 2 shows comparison between Manual RTO and example non-limiting Automatic RTO (SHORTS);
FIG. 3A shows example prior art operation;
FIG. 3B shows example non-limiting improvement in ASD TOW.

DETAILED DESCRIPTION OF EXAMPLE NON-LIMITING EMBODIMENTS

Figure 4:
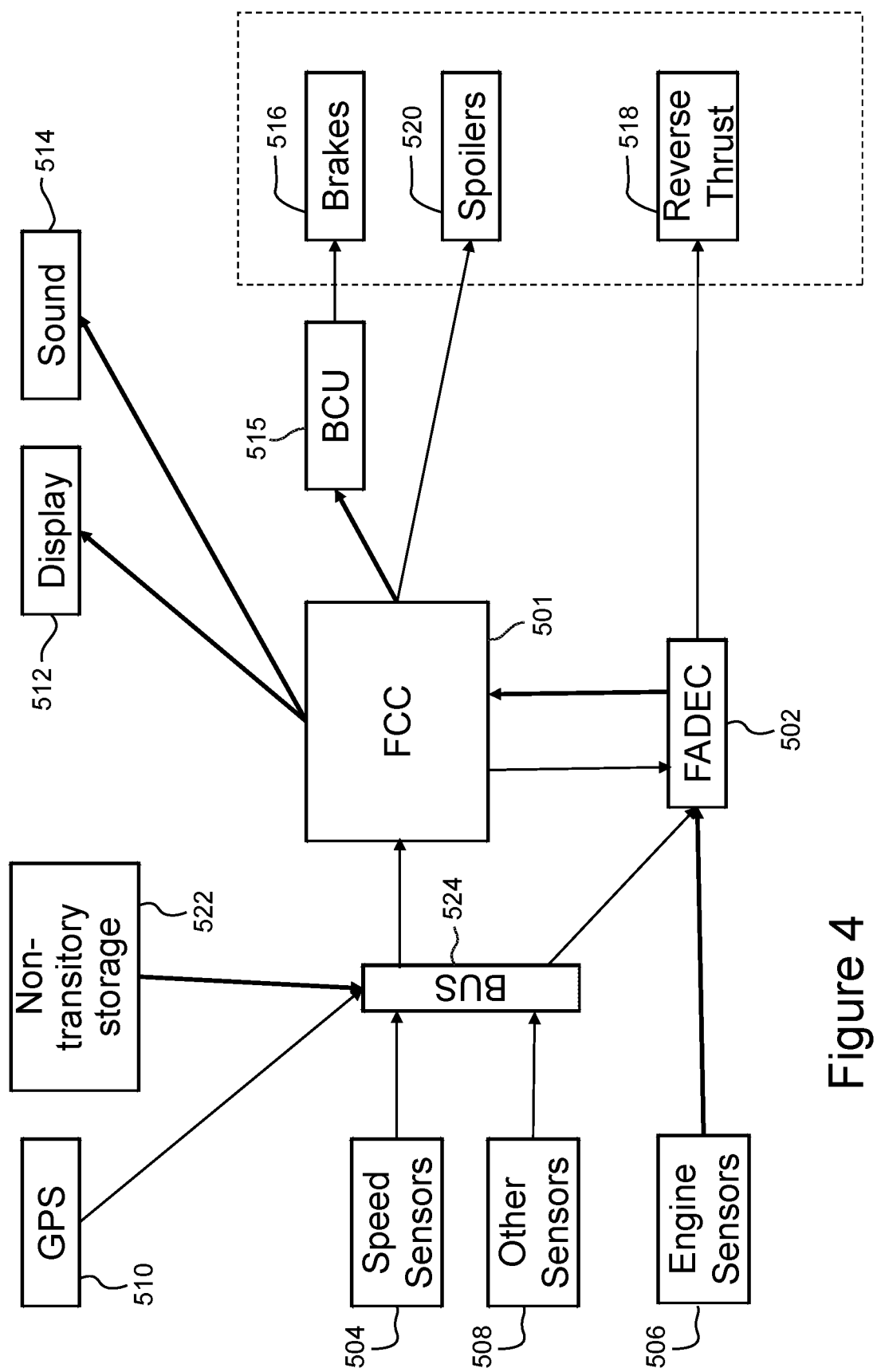
FIG. 4 is a block diagram of an example non-limiting system.

It has been recognized in the past that an automatic system could reduce pilot delay. For example, automatic rejected takeoff systems are known. See for example U.S. Pat. No. 9,164,505, which limits action to situations when the aircraft speed is less than the takeoff decision speed V1 and/or when all monitored status conditions are true. Such limitations on action may be unsuitable for certain applications. Further improvements are therefore possible and desirable.

Some existing aircraft have spoilers that automatically deploy when certain flight conditions are detected. Also, there is an automatic brake system ("Auto-Brake") that, in case of a pilot action to reduce thrust, automatically applies brake pressure in order to stop the aircraft. For example, Embraer's current aircraft already provide Flight Control Computers (FCC), FADEC controllers and automatic control so that when the pilot reduces the thrust levers, the system automatically applies the brakes under appropriate circumstances. In particular, the FADEC signals thrust level reduction to the FCC, which in turn commands the Brake Control Unit (BCU) to apply brake pressure. The speed of brake actuation is always automatic in an RTO case. When the autobrake is armed, the brakes are automatically actuated.

Both cases above initiate only with a pilot action. They do not help reduce pilot delays, but rather only make pilot action more effective when the pilot does act.

EXAMPLE NON-LIMITING ADVANTAGES AND TECHNICAL EFFECTS

Example non-limiting systems and methods herein automatically detect whether the speed of the aircraft does not exceed Vshort, where Vshort>V1; automatically detect whether one of plural engines has failed during takeoff while the aircraft is still in contact with the ground; and if the aircraft speed does not exceed vshort and an engine has failed, automatically perform an autonomous abort takeoff sequence to allow an improved takeoff weight in case of a single engine failure autonomously rejected takeoff.

The disclosed non-limiting embodiments provide automatic response techniques that improve aircraft performance without suffering from the limitations above:

TOW increase leads to increased payload or fuel quantity.

Payload increase allows for increased passenger and/or cargo capability.

Fuel quantity increase allows the aircraft to achieve greater ranges.

An aircraft provided with the proposed system, which reduces ASD, may then operate in shorter runways as compared to an aircraft without the technology herein.

Focus on just one kind of event (engine failure) that will allow the system to initiate the RTO in case of an OEI ASD since this engine failure is the case that determines the OEI ASD.

Improve accelerate-stop distance (ASD) by providing a shorter ASD.

Recognize time of engine failure and also the FAR requirements margins that lead to a greater ASD.

Define some other performance parameters; since the OEI ASD has been improved, the AEO ASD becomes the limiting parameter to define the TOW. Therefore, the V1 speed continues to be defined to AEO for the manual case in order to differentiate Vshort, which is only applied by the system in the OEI ASD case.

Recognize engine failure and provide, without requiring any pilot actuation, the necessary actions to stop the aircraft.

To enable autonomous control, the aircraft speed shall be less than an RTO speed limit named Vshort. This Vshort is different from the takeoff decision speed V1. The takeoff decision speed V1 is still the pilot decision speed in case of an AEO RTO. Vshort shall generally be greater than V1 since this will allow an improved takeoff weight in case of OEI RTO. The system does not consider the takeoff decision speed V1 as a reference to initiate the OEI RTO.

The technology herein does not depend on any fixed speed such as 80 knots or the like; all decisions are made based on calculated and sensed values.

There are only two events that can trigger RTO, both associated with engine operation: (1) engine failure, and (2) engine fire. The non-limiting system considers just one kind of event (engine failure) that will allow the system to initiate the RTO in case of an OEI ASD.

An example non-limiting Short Rejected Takeoff System (SHORTS) is an automatic system that, in case of engine failure—such as, but not limited to, engine fire, rotor burst and/or thrust loss—during takeoff ground run, automatically initiates all actions necessary to stop the aircraft, without requiring any pilot input. These actions can include for example brake application, reverse thrust application and deployment of spoilers. This will be automatically performed by the system after an engine failure signal by a Full Authority Digital Engine Control (FADEC). The FADEC detects and produces a signal indicating an engine issue more quickly than the aircraft yaw produced by the asymmetric thrust can be perceived by the pilot.

In the case of an OEI, there is no pilot action so it is possible to reduce or eliminate the time delays imposed by certification requirements. Instead, the system response times are considered. It is well known that these systems delays are much smaller than the ones defined by the requirements when considering pilot actions. Therefore, it is possible to decrease the ASD in case of an engine failure with an automatic system.

An example difference can be seen in FIG. 2. The top line of FIG. 2 shows the prior art situation, and the bottom line of FIG. 2 shows example improvement using the example non-limiting technology herein. FIG. 2 shows significant improvement in OEI ASD, which leads to an important takeoff weight (TOW) increase. This TOW increase leads to increased Payload or fuel quantity. The Payload increase allows for increased Passenger and/or cargo capability. The fuel quantity increase allows the aircraft to achieve greater range.

Additionally, aircraft provided with the proposed system which reduces ASD, may operate in shorter runways as compared to aircraft without the automatic technology herein.

On the other hand, since the ASD that defines the final weight is the greatest between AEO ASD and OEI ASD, this improvement on OEI ASD does not produce an effective takeoff weight increase if the AEO ASD is not improved too. The example non-limiting embodiment improves AEO ASD too, as is demonstrated below.

In case of engine fire, the preferred embodiment sends a signal to a monitor in order to initiate automatic intervention. In this failure condition, the system also sends a signal to shut down the engine. Optionally, the system can automatically extinguish the engine fire.

Example Non-Limiting Speed Limits for the System (VSHORT) and for the Pilot (V1)

The $V_1$ concept is well known by aeronautical engineers and pilots: It is defined as the (single) speed that limits the decision between aborting or continuing the takeoff when an event such as engine failure occurs:

$V<V_1$→The pilot shall abort the takeoff $V>V_1$→The pilot shall continue the takeoff.

It is also well known that in most cases the AEO ASD is more limiting than the OEI ASD condition due to two engines in idle against only one in case of an engine failure. The engines' idle thrust is in the same direction of the aircraft movement, leading to greater stopping distance. In other words, upon detecting that an engine has failed and no longer is delivering thrust, an-board system can automatically calculate the gain in available stopping distance on the runway due to the decreased overall engine thrust which will naturally result in reduced acceleration of the aircraft.

Considering that:

1) The TOW can be increased in the OEI ASD case;

2) The main objective is to decrease the overall ASD (AEO and OEI); and

3) The AEO ASD is the limiting condition, it is possible to detach the OEI from the AEO condition, since the pilot will act only in the AEO case and the system will function only in case of engine failure.

In the example non-limiting embodiment, two different speeds will be defined:

"$V_{SHORT}$": System speed limit to abort or to continue the takeoff (OEI)

$V<V_{SHORT}$→the system shall abort the takeoff $V>V_{SHORT}$→the system shall continue the takeoff $V_1$: Pilot speed limit to abort or to continue the takeoff (AEO only)

$V<V_1$→The pilot shall abort the takeoff $V>V_1$→The pilot shall continue the takeoff.

Since the TOW related to the OEI ASD has been increased, the next step is to improve the AEO ASD. This is done considering a $V_1$ speed lower than $V_{SHORT}$. In other words, the $V_1$ speed, detached from $V_{SHORT}$, is defined so that the aircraft will be stopped with all engines operating in the same distance as the OEI ASD case, with the increased TOW obtained from the OEI ASD condition (see FIGS. 3A, 3B). FIG. 3A shows a prior art example in which in the AEO condition, V1 is achieved earlier due to the acceleration of two engines instead of only one (after engine failure). On the other hand, in an AEO condition, there are two engines at idle, which lead to a greater distance from V1 to stop. FIG. 3B shows an improved operation provided by the example non-limiting technology herein. In this case, V1<Vshort in order to stop in the same runway with increased TOW. V1 is the speed that produces, with TOW, the AEO ASD equal to OEI ASD. Note that the FIG. 3B example uses a higher TOW, and is able to maximize both the automatic aborted takeoff ASD when a single engine fails (top line FIG. 3B) and the manual aborted takeoff then no engine fails (bottom line FIG. 3B).

Additional Concepts and Definition Summary
AC: Advisory Circular
ASD: Accelerate-Stop Distance
RTO: Rejected Take-Off
$V_1$: Takeoff Decision Speed—the speed limit to abort or continue the takeoff:
   Up to $V_1$, the pilot must abort the takeoff
   Above $V_1$, the pilot must continue the takeoff
Engine Thrust:
   AEO: All Engines Operating
   OEI: One Engine Inoperative
FADEC: Full Authority Digital Engine Control
FCC: Flight Control Computer(s)
VEF: Engine Failure Speed
Accelerate-Stop Distance and Takeoff Weight Definitions
ASD—The accelerate-stop distance is the greater of:
   Distance required to accelerate the airplane to $V_1$ and then decelerate to a complete stop with All Engines Operating (AEO).
   Distance required to accelerate the airplane to VEF with AEO, then accelerate to $V^1$ with One Engine Inoperative (OEI) and then decelerate to a complete stop (OEI).
TOW: Accelerate-Stop Takeoff Weight; the highest weight that satisfies both ASD definitions above for a given runway.

More Detailed of Example Non-Limiting Embodiment

Figure 5:
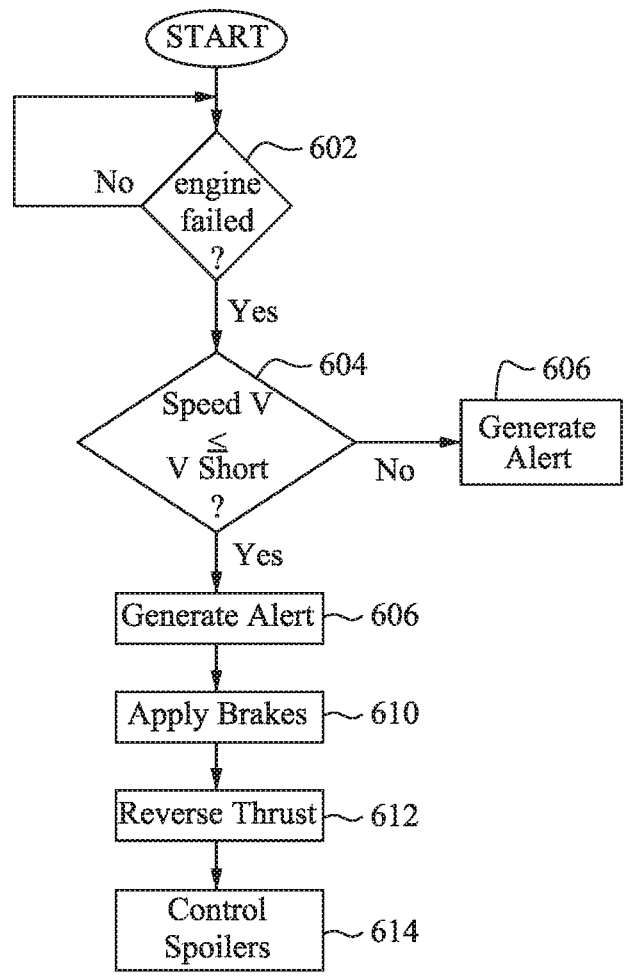
FIG. 5 is a flowchart of example non-limiting software controlled steps.

FIGS. 4 and 5 show a detailed example non-limiting implementation. In FIG. 4, a Flight Controller Computer (FCC) 501 and a FADEC controller 502 receive signals via bus 524 from speed sensors 504 and other sensor 508. Such FCC computer 501 and FADEC controller 502 are well known and available from a number of different avionics suppliers. The FCC 501 and the FADEC controller 502 may also receive location information from a geosensor such as a GPS receiver 510 via bus 524. Additionally, the FADEC 502 in this example receives information from engine sensors 506.

In the example non-limiting embodiment, the FCC 501 is responsible for the reception, treatment and computations of the multitude of signals from different sources, such as probes, meters, sensors and the FADEC 502. Therefore, the FCC 501 is the computing core of the system, so the FADEC 502 provides signals to the FCC, together with other signals. The FCC 501 processes these signals, comparing to the proposed logic, and takes action by sending back signals to the FADEC 502, commanding the reverse thrust 518, and to other braking action actuators such as the BCU (Brake Control Unit) 515 and spoilers actuators 520. The FADEC controller 502 in conjunction with the FCC 501 can thus autonomously control brakes 516, the remaining engine(s) to apply reverse thrust 518, and spoilers or other control surfaces 520.

In one example non-limiting implementation, all calculations and logic are implemented into FCC type computer 501. The FADEC 502 is responsible only for providing a signal to "inform" the FCC 501 that one (and which) engine has failed (this signal is already present in a conventional FADEC). The rest of the FADEC 502 operation remains the same. FCC 501 is modified with additional software-based functionality and I/O as discussed below. For example, Vshort can be specified based on pilot input (much like the V1 today) or automatically by internal calculation performed by the FCC 501. The FADEC 502 need not be changed even though its conventional engine-failed output is being used for a new purpose: informing the FCC 502 of engine failure to enable the FCC to take automated action as discussed herein.

When the system engages to start the automatic RTO, it will send a signal to the FADEC 502, much like the regular prior art Thrust Lever would, commanding the FADEC to slow the engines down. In this whole process, the example non-limiting FADEC 502 is "passive" so to speak with respect to the automated RTO functionality and does not require modification.

Displays 512 and sound actuators 514 are then linked to the FCC 501, receiving signals from it. The FADEC controller 502 can thus output various signals to FCC 502 which can cause human indications to be provided on display 512 and via a sound actuator 514.

In one example non-limiting embodiment, the FCC 501 and the FADEC 502 are implemented by digital controllers executing software instructions for which are shown in FIG. 5. The software instructions can be stored in non-transitory storage devices 522 accessible via bus 524. In other implementations, FCC 501 and/or FADEC controller 502 may include or comprise programmed logic circuitry, a hardware gate array(s), a digital signal processor(s), a microprocessor(s), a computer(s), analog computation circuitry, or any other implementation as known to those skilled in the art. In some embodiments, FCC 501 and FADEC 502 can comprise conventionally programmed devices that detect engine failure and provide an output signal that is processed by an additional computer or other processor to control brakes, spoilers and reverse thrust. In other examples, the functions above can all be integrated within a single integrated controller 502.

As shown in FIG. 5, the FCC 501 and FADEC controller 502 monitor engine sensors 506 to detect whether an engine has failed. Such engine failure detection can be accomplished through a combination of temperature sensing, thrust sensing, optical sensing, vibration or noise sensing, etc. Once FCC 501 and FADEC controller 502 make a highly reliable determination that an engine has failed ("Y" exit to decision block 602), the FCC 501 and FADEC controller determine based on speed sensor(s) 504 and/or GPS 510 what speed the aircraft is travelling. If the detected speed is above Vshort>V1, the FCC 501 and FADEC controller 502 determine that the aircraft speed is too high to abort takeoff safely ("N" exit of decision block 604). On the other hand, if the detected speed is below Vshort>V1, the FCC 501 and FADEC controller 502 determine that the detected speed is not too high (given the automatic nearly instantaneous reaction time of the FADEC itself) to abort takeoff ("Y" exit of decision block 604).

In example non-limiting embodiments herein, the takeoff decision speed, $V_1$, is not considered in order to enable automatic intervention. Instead, in order to enable an automatic intervention, the aircraft speed shall be less than a RTO speed limit, named $V_{SHORT}$. This $V_{SHORT}$ is different from the takeoff decision speed, $V_1$ the pilot continues to use for manual RTO. In particular, the takeoff decision speed, $V_1$, is still the pilot decision speed in case of an AEO RTO. The $V_{SHORT}$ usually will be greater than $V_1$ since this will allow an improved takeoff weight in case of OEI RTO. $V_{SHORT}$ is thus the system speed limit to abort or to continue the takeoff:

V<VSHORT→the system shall automatically abort the takeoff

V>VSHORT→the system shall continue the takeoff.

Either way, FCC 501 and FADEC controller 502 will generate an alert to inform the crew that an engine has failed (blocks, 606, 608). But in the case where it is possible given the aircraft speed<Vshort to abort the takeoff ("Y" exit to decision block 604), the FCC 501 and FADEC controller 502 autonomously take action to abort the takeoff by applying braking action (block 610), reversing thrust (block 612) and controlling spoilers (block 614). It should be apparent that when Vshort>V1, the system can abort the takeoff at speeds less than, including and above V1 all the way up to Vshort—a value that is used only by the system for automatic RTO under certain conditions and which the pilot does not use for manual decisionmaking.

In the example shown, FCC 501 and FADEC controller 502 compute Vshort before the takeoff begins, based on a number of factors such as the type of aircraft, the weight or mass of the aircraft, the length of the runway, etc.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An automatic aircraft takeoff control method for use with an aircraft having a takeoff weight and plural engines, the method comprising:
    (a) measuring the speed of the aircraft;
    (b) automatically comparing, with at least one processor, the measured speed of the aircraft with a predetermined speed Vshort, wherein the speed Vshort is greater than a speed V1, where V1 is the decision speed and Vshort is a higher speed than the decision speed and is different from the decision speed;
    (c) automatically detecting, with the at least one processor, whether one of said plural engines has failed during takeoff while the aircraft is still in contact with the ground;
    (d) when the measured aircraft speed exceeds decision speed V1 but does not exceed speed Vshort and only when the at least one processor detects an engine has failed, the at least one processor automatically controlling performance of an autonomous abort takeoff sequence in case of a single engine failure autonomously rejected takeoff to thereby allow an aircraft takeoff weight that is higher than if (d) were not performed automatically; and
    (e) when the measured aircraft speed exceeds speed-Vshort, the at least one processor automatically enabling continuance of takeoff even when the at least one processor detects an engine has failed.

2. The method of claim 1 wherein the abort takeoff sequence includes autonomously applying braking.

3. The method of claim 1 wherein the abort takeoff sequence includes autonomously applying reverse thrust.

4. The method of claim 1 wherein the abort takeoff sequence includes autonomously controlling spoilers.

5. The method of claim 1 wherein steps (b)-(d) are performed by a combination of a flight control computer and a Full Authority Digital Engine Control system.

6. The method of claim 5 further including programming the flight control computer and/or the Full Authority Digital Engine Control system to further support, in addition to the autonomous abort takeoff sequence, the pilot manually initiating an all engines operating rejected takeoff conditioned on the speed of the aircraft being below decision speed V1.

7. An aircraft takeoff control system comprising:
    (a) at least one speed sensor that automatically detects the speed of the aircraft;
    (b) at least one ground contact sensor that automatically detects whether the aircraft has left the runway;
    (c) at least one computer configured to determine whether the detected aircraft speed does not exceed a speed Vshort, where the speed Vshort is greater than a speed V1, where V1 is the decision speed and Vshort is a higher speed than the decision speed and is different from the decision speed; and
    (d) at least one engine sensor that automatically detects whether an engine has failed;
    (e) the at least one computer being configured to, in response to the detected aircraft speed exceeding the speed V1 but not exceeding the speed Vshort and only when the at least one engine sensor detecting an engine has failed during takeoff while the aircraft is still on the runway, automatically performing an autonomous abort takeoff sequence to thereby allow an aircraft takeoff weight that is higher than if the abort takeoff sequence were not performed autonomously; and when the detected aircraft speed exceeds speed Vshort, automatically enabling continuance of takeoff even when the at least one engine sensor detects an engine has failed.

8. The system of claim 7 wherein the abort takeoff sequence includes autonomously applying braking.

9. The system of claim 7 wherein the abort takeoff sequence includes autonomously applying reverse thrust.

10. The system of claim 7 wherein the abort takeoff sequence includes autonomously controlling spoilers.

11. The system of claim 7 wherein the at least one computer comprises a flight control computer and a Full Authority Digital Engine Control system.

12. An automatic aircraft takeoff control method for use with an aircraft having a takeoff weight and plural engines, the method comprising:
    (a) automatically detecting whether the speed of the aircraft does not exceed V1;
    (b) automatically detecting whether the speed of the aircraft does not exceed Vshort, where Vshort>V1, where V1 is the decision speed and Vshort is a higher speed than the decision speed and is different from the decision speed;
    (c) automatically detecting whether one of said plural engines has failed during takeoff while the aircraft is still in contact with the ground;
    (d) only if an engine has failed and the aircraft speed exceeds speed V1 but does not exceed speed Vshort, automatically performing an autonomous abort takeoff sequence;
    (e) when the aircraft speed does not exceed V1, enabling a pilot to manually perform an abort takeoff sequence, to thereby allow a takeoff weight that is higher than if (d) were not performed automatically; and (f) when the detected aircraft speed exceeds speed Vshort, automatically enabling continuance of takeoff even when (c) detects that one of said plural engines has failed.

* * * * *